US008126149B2

(12) United States Patent
Hara et al.

(10) Patent No.: US 8,126,149 B2
(45) Date of Patent: Feb. 28, 2012

(54) COMMUNICATION APPARATUS HAVING POWER-SAVING COMMUNICATION FUNCTION, AND COMMUNICATION METHOD

(75) Inventors: Kazutoshi Hara, Kawasaki (JP); Masanori Nakahara, Chigasaki (JP); Hiroshi Mashimo, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1022 days.

(21) Appl. No.: 11/347,419

(22) Filed: Feb. 3, 2006

(65) Prior Publication Data

US 2007/0173296 A1 Jul. 26, 2007

(30) Foreign Application Priority Data

Feb. 15, 2005 (JP) ................................ 2005-037718

(51) Int. Cl.
*H04L 9/00* (2006.01)

(52) U.S. Cl. ......................... 380/277; 713/168; 380/270

(58) Field of Classification Search .................. 713/169, 713/151, 171, 340; 726/24
See application file for complete search history.

(56) References Cited

U.S. PATENT DOCUMENTS

| | | | | |
|---|---|---|---|---|
| 5,523,982 | A * | 6/1996 | Dale | 367/131 |
| 6,223,285 | B1 * | 4/2001 | Komuro et al. | 713/160 |
| 6,957,276 | B1 * | 10/2005 | Bahl | 709/245 |
| 6,961,762 | B1 * | 11/2005 | Yeap et al. | 709/221 |
| 7,203,526 | B2 * | 4/2007 | Frank | 455/574 |
| 2003/0050009 | A1 | 3/2003 | Kurisko et al. | |
| 2003/0074566 | A1 * | 4/2003 | Hypponen | 713/183 |
| 2005/0138377 | A1 * | 6/2005 | First et al. | 713/169 |
| 2007/0046634 | A1 * | 3/2007 | Rice | 345/168 |
| 2007/0060213 | A1 * | 3/2007 | Yoshida | 455/574 |

FOREIGN PATENT DOCUMENTS

| | | |
|---|---|---|
| JP | 2003-348095 A | 12/2003 |
| JP | 2004-120213 A | 4/2004 |
| JP | 2004-165791 A | 6/2004 |
| JP | 2004-349777 A | 12/2004 |

OTHER PUBLICATIONS

"3 Power Management for Ad Hoc Network (IBSS)" and Fig. 5-6, in 802.11 High-Speed Wireless LAN Textbook, pp. 111-112., 2005.

* cited by examiner

*Primary Examiner* — Edan Orgad
*Assistant Examiner* — Brian Olion
(74) *Attorney, Agent, or Firm* — Canon USA Inc. IP Division

(57) ABSTRACT

A communication apparatus which starts communication using a power-saving function changes, with its communication counterpart, a key for a confidential mode and performs power-saving communication. When terminating the power-saving function, the communication apparatus returns, with its communication counterpart, the key for the confidential mode to the original one. Then, after returning the key for the confidential mode to the original one, the communication apparatus performs an IP address reassignment process.

7 Claims, 8 Drawing Sheets

COMMUNICATION APPARATUS HAVING POWER-SAVING COMMUNICATION FUNCTION, AND COMMUNICATION METHOD

BACKGROUND OF THE INVENTION

1. Field of the Invention

The present invention relates to a communication apparatus having a power-saving communication function, and to a communication method.

2. Description of the Related Art

Among wireless communication apparatuses, there exists one having a technique, called a power-saving control function that reduces operating power during standby to reduce power consumption. In the power-saving control function, a receiving frame period is divided into two periods. During a first period, a notification signal indicating whether there is a data delivery to a wireless communication apparatus is sent. During a second period, communication of data to be delivered is performed.

Here, when a wireless communication receiver apparatus finds out by a notification signal received during the first period that there is no data delivery thereto, the apparatus reduces power for receiving during the second period to the minimum necessary, thus achieving power saving. On the other hand, when the wireless communication receiver apparatus finds out by a notification signal received during the first period that there is data to be delivered thereto, the apparatus performs a data receiving process without reducing power for receiving during the second period.

In an infrastructure mode with a base station, which is defined by the IEEE802.11 standard, the base station manages the power-saving state of other wireless communication apparatuses. Whether there is data is notified, by TIM (Traffic Indication Map) information in a beacon, to a wireless communication apparatus in a power-saving state. If there is data to be delivered, the data is transmitted during a subsequent period.

On the other hand, in an ad hoc network that allows wireless communication apparatuses to directly communicate with each other without using a particular base station, whether there is data to be delivered to a counterpart is notified, by an ATIM (Announcement Traffic Indication Message) after a beacon, to a wireless communication apparatus in a power-saving state. A wireless communication apparatus that is notified by an ATIM that there is data to be transmitted thereto receives the data during a subsequent period.

In the ad hoc network, however, there may be a case where each of wireless communication apparatuses that are joined to the network cannot recognize the power-saving state of other wireless communication apparatuses. Hence, when a certain wireless communication apparatus is in a state where a power-saving control function during standby is effective and a receiver of the apparatus is turned off, data may be transmitted to the wireless communication apparatus without ATIM notifying about data transmission. In this case, the wireless communication apparatus cannot receive the data transmitted.

For example, assume that a packet for checking an IP address (Internet Protocol Address) is broadcast onto an ad hoc network and there is a wireless communication apparatus that cannot receive the packet. For example, assume that a first wireless communication apparatus cannot receive an ARP Request (Address Resolution Protocol Request). In this case, since the first wireless communication apparatus cannot respond to the ARP Request, a second wireless communication apparatus having transmitted the ARP Request may obtain the same IP address as that of the first wireless communication apparatus. If the IP addresses overlap, the first wireless communication apparatus may receive data to be delivered to the second wireless communication apparatus, resulting in performing an unnecessary process. In addition, the second wireless communication apparatus may respond to data to be delivered to the first wireless communication apparatus, impairing normal communication.

In addition, even if wireless communication apparatuses which are joined to an ad hoc network and which want to communicate with each other exclusively go into a power-saving state, the power-saving state may be canceled by a request from a wireless communication apparatus that is not in a power-saving state. In this case, the wireless communication apparatuses cannot communicate with each other exclusively. In addition, in this case, a low power consumption effect is hampered.

As described above, there are a lot of problems with the use of a low power consumption function (power-saving function) and, thus, the power-saving function has not been efficiently used.

SUMMARY OF THE INVENTION

The present invention is directed to allow a power saving function to be efficiently used.

The present invention is further directed to solve the problems associated with the use of the power-saving function.

In one aspect of the present invention, a communication apparatus includes a communication unit having a power-saving function configured to initiate a transition to a power-saving state, and an encryption unit configured to transition to an encrypted communication state where a predetermined encryption key is used when the communication unit initiates the transition to the power-saving state.

In another aspect of the present invention, a communication apparatus includes a transition unit configured to transition to a communication state where a power-saving function is used, and an information identification determination unit configured to perform a process of determining identification information about the communication apparatus when the transition unit terminates the communication state where the power-saving function is used.

In another aspect of the present invention, a communication method includes a transition step of transitioning to a communication state where a power-saving function is used, and an encryption step of performing encrypted communication using a predetermined encryption key, when the transition step transitions to a communication state where the power-saving function is used.

In another aspect of the present invention, a communication method includes a power-saving communication step of performing communication using a power-saving function, and an information identification determination step of performing a process of determining identification information about a communication apparatus when terminating the communication state where the power-saving function is used.

In another aspect of the present invention, a communication apparatus transitions to an encrypted communication state where a predetermined encryption key is used, when transitioning to a communication state where a power-saving function is used.

In addition, the communication apparatus performs a process of determining identification information about the communication apparatus when terminating the communication state where the power-saving function is used.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE EMBODIMENTS

Exemplary embodiments of the invention will be described in detail below with reference to the drawings.

First Embodiment

In a first embodiment, a digital camera (hereinafter referred to as a "camera"), which serves as an image capture apparatus, and a printer, which serves as an output apparatus, are wirelessly connected in an ad hoc mode compliant with the IEEE802.11 standard. Further, even when the camera and the printer are allowed to operate in a power-saving mode (hereinafter referred to as a "PS mode") using a power-saving control function, data communication without a mismatch is assured. Note that the PS mode in the present embodiment is a power-saving mode that is defined by the IEEE802.11 standard. When there is no data to be received during receiving standby, the power of a receiver after an ATIM window terminates is reduced to the minimum necessary and power saving is achieved.

Figure 1:
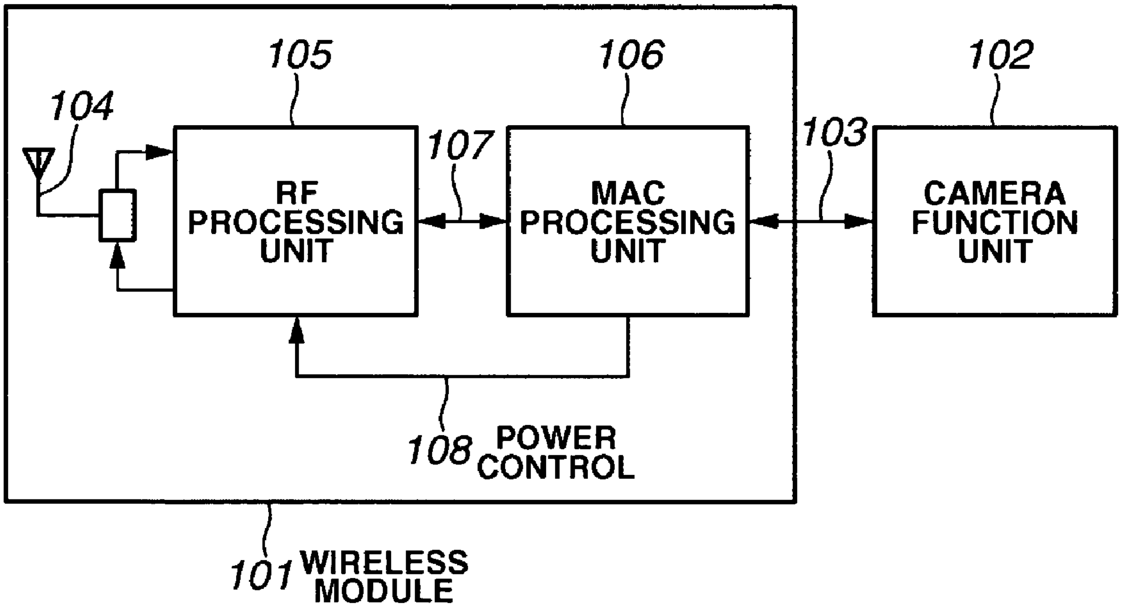
FIG. 1 is a block diagram showing an exemplary configuration of a camera according to an embodiment of the present invention.

FIG. 1 is a block diagram showing a configuration of a camera according to the first embodiment. The camera is broadly divided into a camera function unit 102 and a wireless module 101. The camera function unit 102 has a camera photographing function, a TCP/IP (Transmission Control Protocol/Internet Protocol) data processing function, and a function of controlling the wireless module 101 and performing data communication. Control of the wireless module 101 is performed using a memory interface 103 such as an interface to a CompactFlash® memory. The wireless module 101 includes a wireless LAN function (PHY (Physical Layer Device), MAC (Media Access Controller)) compliant with the IEEE802.1 standard and a function of communicating with the camera function unit 102. The wireless module 101 is divided into a MAC processing unit 106, an RF (radio frequency) processing unit 105, and an antenna 104. The MAC processing unit 106 has a function of MAC and PHY in a wireless LAN (local area network) compliant with the IEEE802.11 standard, a function of communicating with the camera function unit 102, and a function of controlling the RF processing unit 105. Control of the RF processing unit 105 by the MAC processing unit 106 is performed using a power control interface 108 and a transmission and reception process interface 107. Control of the transmission power of a packet is performed using the power control interface 108. The RF processing unit 105 performs a PHY function compliant with the IEEE802.11 standard and transmits/receives data via the antenna 104.

Figure 2:
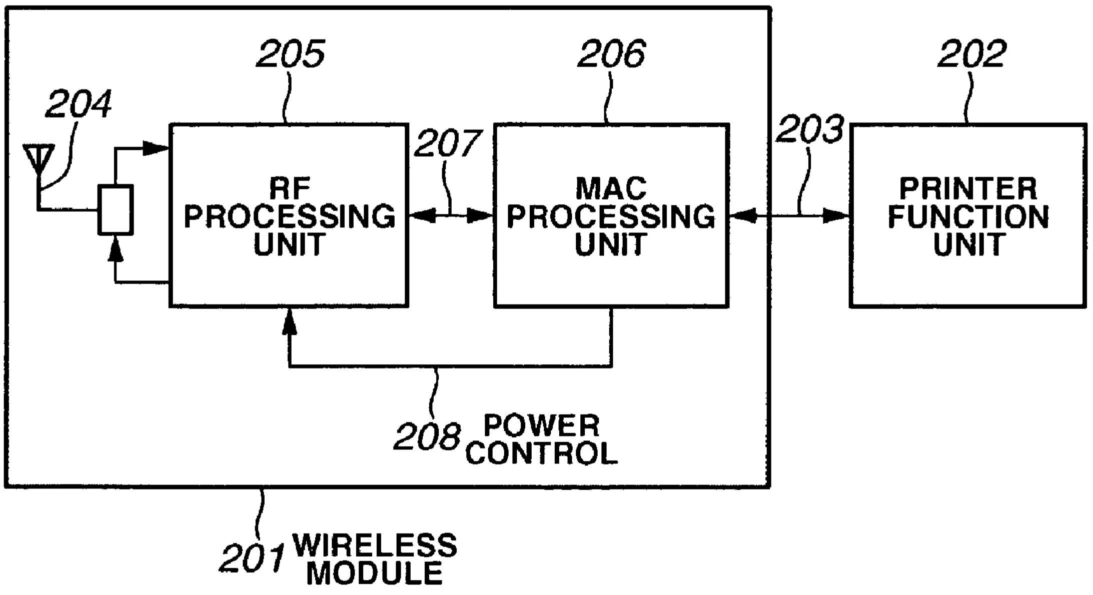
FIG. 2 is a block diagram showing an exemplary configuration of a printer according to the embodiment of the present invention.

FIG. 2 is a block diagram showing a configuration of a printer according to the first embodiment. The printer is broadly divided into a printer function unit 202 and a wireless module 201. The printer function unit 202 has a printer printing function, a TCP/IP data processing function, and a function of controlling the wireless module 201 and performing data communication. A description of the wireless module 201 is the same as that of the wireless module 101 of FIG. 1, and thus, is not repeated here.

Figure 3:
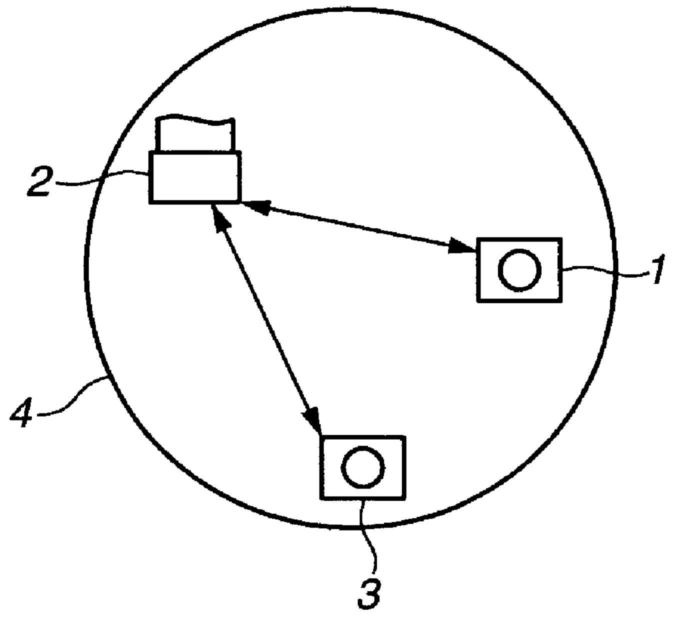
FIG. 3 is a network configuration diagram of the printer and the camera before the operation of a power-saving (PS) function starts, according to the embodiment of the present invention.

FIG. 3 shows a configuration of a network 4 that includes a printer 2 and cameras 1 and 3 before the operation by a PS mode starts. The network 4 is an ad hoc network compliant with the IEEE802.11 standard and allows wireless communication apparatuses to directly communicate with each other without using a particular base station. It is assumed that the network 4 is preset to a first confidential mode where encrypted communication is performed using a WEP (Wired Equivalent Privacy) key compliant with the IEEE802.11 standard.

FIG. 3 shows a state where the camera 1 communicates with the printer 2 and the camera 3 communicates with the printer 2. Here, the case is considered where the camera 1 starts communicating with the printer 2 in a PS-mode state. A PS start process performed by the camera 1 is described next with reference to FIG. 7.

When the camera 1 receives a PS start request that is an instruction to transition to a PS mode, from an upper layer such as an application layer (yes in step S701), the camera 1 sends a PS start request to the printer 2, which is a communication counterpart of the camera 1 (step S702). When the printer 2 receives the PS start request from the camera 1, the printer 2 sends a PS start confirmation as a response signal to the camera 1. The camera 1 receives the PS start confirmation from the printer 2 (step S703). Thereafter, the camera 1 determines with the printer 2, a WEP key to be used after transitioning to the PS mode, sets the determined new WEP key, and changes to a second confidential mode (step S704). Then, the camera 1 transitions to the PS mode and performs a PS process (step S705). The PS start process then ends.

Figure 7:
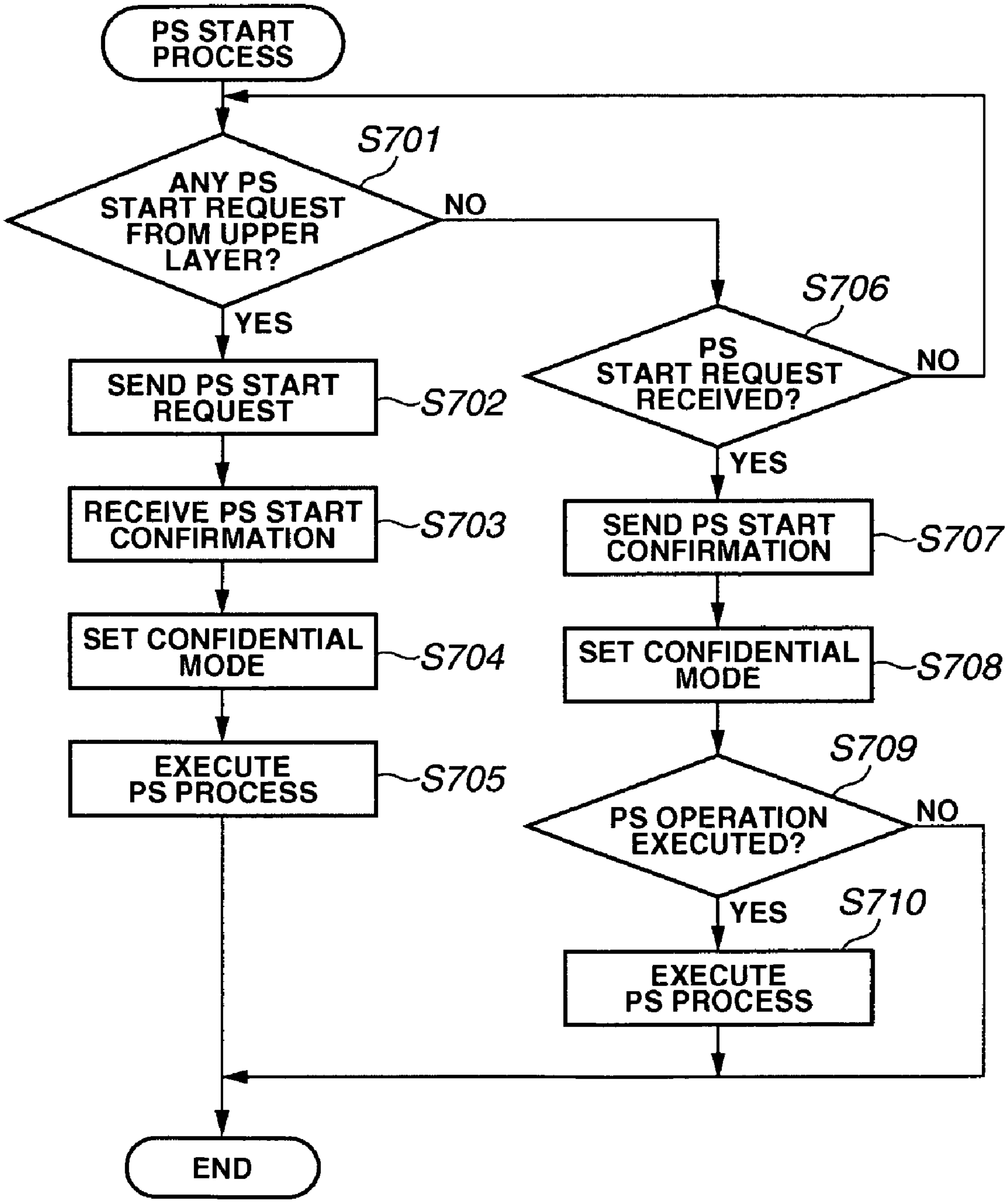
FIG. 7 is a flowchart of a PS function operation start process according to the embodiment of the present invention.

Likewise, a PS start process performed by the printer 2 will be described with reference to FIG. 7.

When the printer 2 receives a PS start request from the camera 1 (yes step S706), the printer 2 sends a PS start confirmation to the camera 1 (step S707). Then, the printer 2 determines with the camera 1 a new WEP key, sets the determined, new WEP key, and changes to the second confidential mode (step S708). The printer 2 then determines whether to transition to the PS mode (step S709). Since the printer 2 is supplied with sufficient power from an outlet, the printer 2 does not need to transition to the PS mode. Therefore, without transitioning to the PS mode, the printer 2 communicates with the camera 1 in the second confidential mode.

Figure 4:
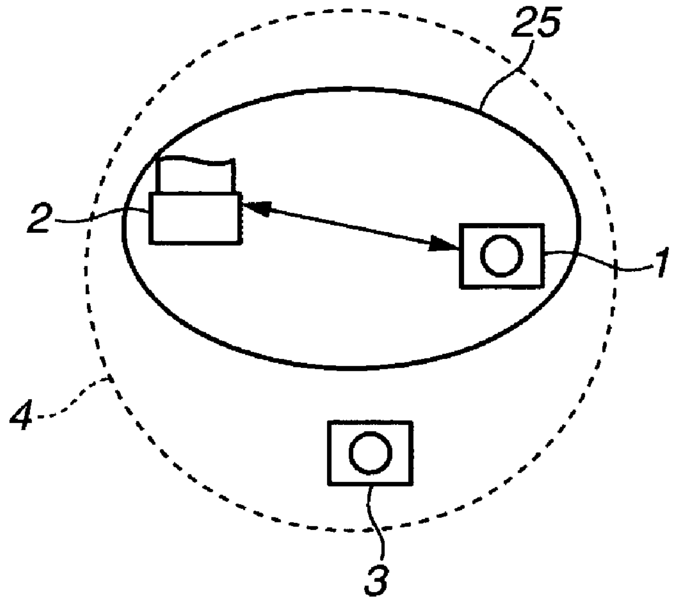
FIG. 4 is a network configuration diagram showing a state where the PS function is in operation, according to the embodiment of the present invention.

This results in a state shown in FIG. 4. Specifically, the camera 1 transitions to the PS mode and performs communication while allowing a PS function that enables communication in the second confidential mode to operate. The printer 2 performs, without transitioning to the PS mode, communication while allowing the PS function that enables communication in the second confidential mode to operate. Hence, as shown in FIG. 4, even though the camera 1 and the printer 2 are on the network 4, the camera 1 and the printer 2 act as if they are on another network 25. Note that the communication between the camera 1 and the printer 2 is changed to the second confidential mode by a new WEP key. Accordingly, other wireless communication apparatuses (e.g., the camera 3) cannot receive data from the camera 1 or the printer 2, and likewise, the camera 1 and the printer 2 cannot receive data from other wireless communication apparatuses (e.g., the camera 3).

Figure 5:
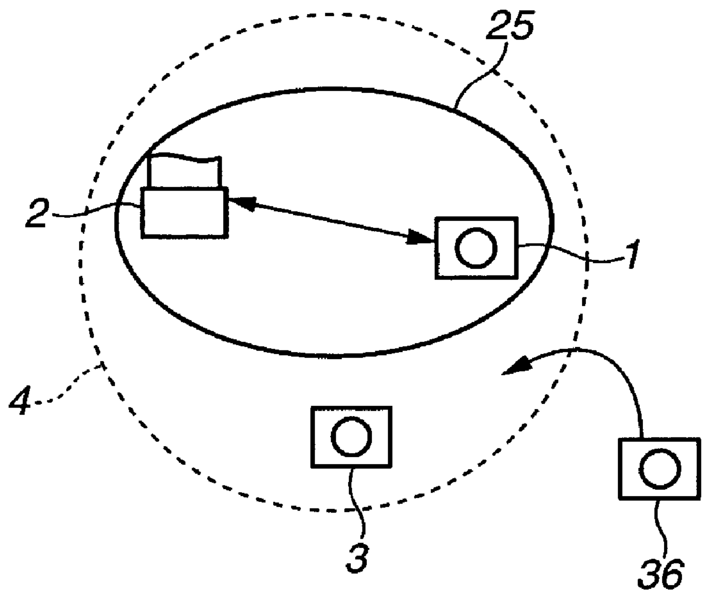
FIG. 5 is a network configuration showing a state where a new entrant is joined, according to the embodiment of the present invention.

Here, the case is considered where, as shown in FIG. 5, while the camera 1 and the printer 2 communicate with each other while allowing the PS function to operate, a camera 36 newly joins the network 4. After the camera 36 joins the network 4, in order to check whether there is a wireless communication apparatus having the same IP address as that of the camera 36, the camera 36 broadcasts an ARP Request message onto the network 4. Since the camera 1 and the printer 2 communicate with each other while allowing the PS function to operate, the camera 1 and the printer 2 cannot receive the ARP Request message from the camera 36. Thus, the camera 1 and the printer 2 do not send back a response to the ARP Request message. This may cause the camera 36 to overlappingly assign to itself the IP address that is already used by either the camera 1 or the printer 2. For example, suppose that the IP address assigned to the camera 36 is the same as the IP address assigned to the camera 1. At this point, even if the camera 36 and the camera 1 have the same IP address, since the communication between the camera 1 and the camera 36 is blocked because of the second confidential mode, a data mismatch or the like does not occur.

Now the case is considered where the camera 1 thereafter terminates the communication with the printer 2 while allowing the PS function to operate in accordance with an instruction from the upper layer.

A PS termination process performed by the camera 1 is described next with reference to FIG. 8.

When the camera 1 receives a PS termination request from the upper layer such as the application layer (yes in step S801), the camera 1 sends a PS termination request to the printer 2 (step S802). The printer 2 having received the PS termination request sends a PS termination confirmation to the camera 1. The camera 1 receives the PS termination confirmation from the printer 2 (step S803). Thereafter, the camera 1 determines whether the camera 1 is transitioned to the PS mode (step S804). If the camera 1 is transitioned to the PS mode, the camera 1 performs a PS termination process of terminating the PS mode (step S805). Then, in order to return to communication that uses a WEP key used in the first confidential mode, the camera 1 resets the same WEP key as that for the network 4 and cancels the second confidential mode (step S806). Further, the camera 1 broadcasts an ARP Request message onto the network 4 and performs an IP address reassignment process (step S807). When the IP address reassignment is completed, the camera 1 performs communication in a normal communication state where the power-saving control function is not used.

Likewise, a PS termination process performed by the printer 2 will be described with reference to FIG. 8.

When the printer 2 receives a PS termination request from the camera 1 (yes in step S808), the printer 2 sends a PS termination confirmation to the camera 1 (step S809). Thereafter, the printer 2 determines whether the printer 2 is transitioned to the PS mode (step S810). If the printer 2 is transitioned to the PS mode, the printer 2 performs a PS termination process of terminating the PS mode (step S811). If the printer 2 is not transitioned to the PS mode, the procedure proceeds to step S812. Since the printer 2 is not transitioned to the PS mode, the printer 2 proceeds to step S812 without performing the PS termination process. In order to return to communication that uses a WEP key used in the first confidential mode, the printer 2 resets the same WEP key as that for the network 4 and cancels the second confidential mode (step S812). Further, the printer 2 broadcasts an ARP Request message onto the network 4 and performs an IP address reassignment process (step S813). When the IP address reassignment is completed, the printer 2 performs communication in a normal communication mode state where the power-saving control function is not used.

Figure 6:
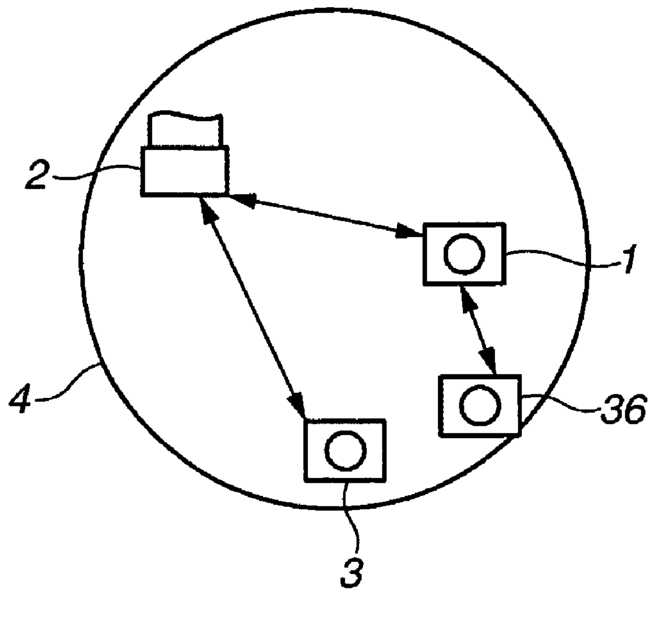
FIG. 6 is a network configuration diagram showing a state where the operation of the PS function has terminated, according to the embodiment of the present invention.

This results in a state where, as shown in FIG. 6, the cameras 1, 3, and 36 and the printer 2 belong to the same network 4. Since the camera 1 and the printer 2 have already performed an IP address reassignment, a data mismatch or the like, which may be caused by the overlap of the IP address with the camera 36 that is joined to the network 4 during the operation of the PS function, does not occur.

Figure 9:
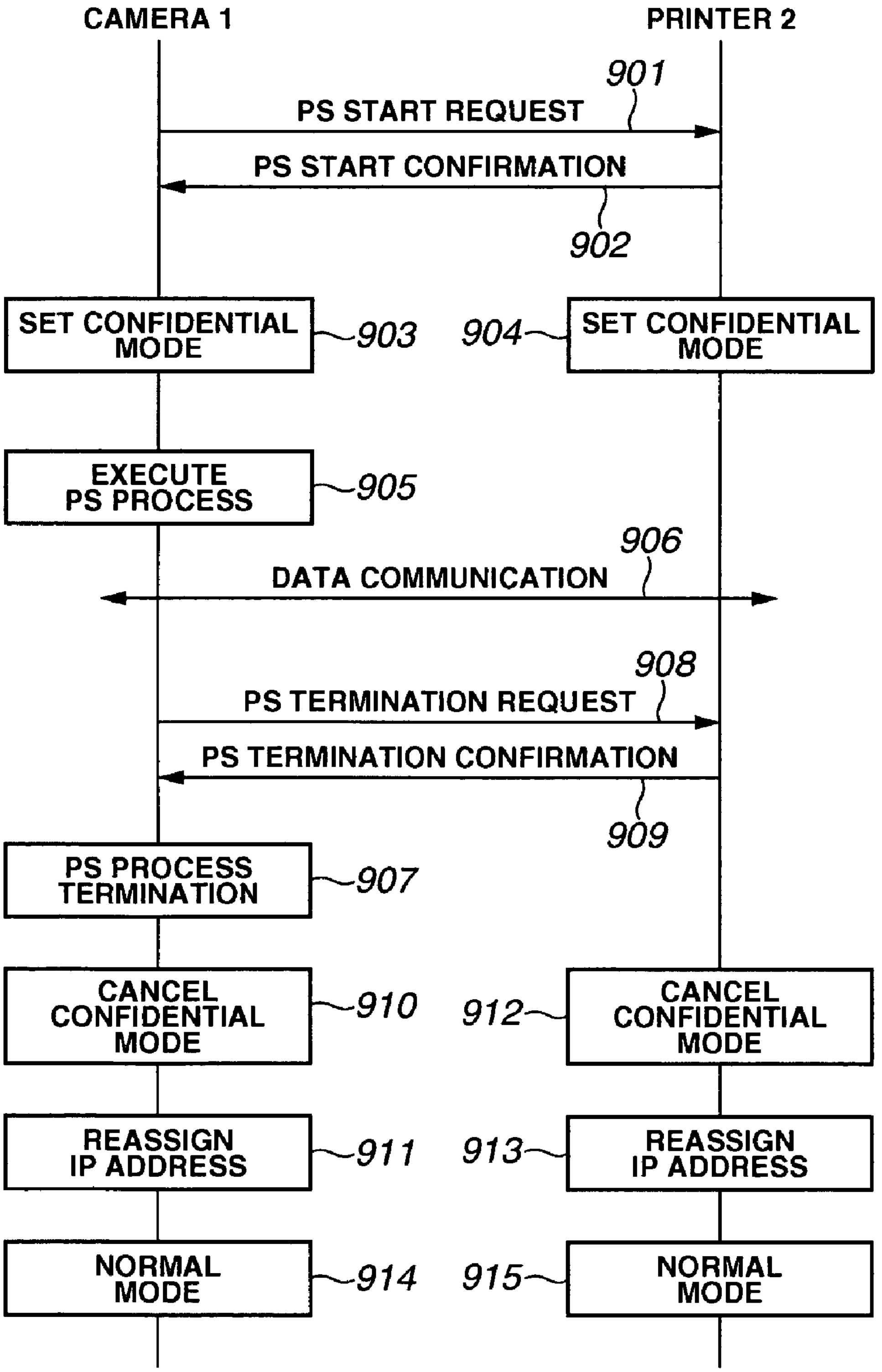
FIG. 9 is a sequence diagram according to the embodiment of the present invention.

A communication sequence up to this point in which the camera 1 and the printer 2 communicate with each other while allowing the PS function to operate is described next with reference to FIG. 9.

The camera 1 sends a PS start request 901 to the printer 2. The printer 2 having received the PS start request 901 sends a PS start confirmation 902 to the camera 1. Thereafter, both the camera 1 and the printer 2 set a second confidential mode (903, 904). The camera 1 transitions to a PS mode and starts data communication 906. When the camera 1 completes the data communication 906, a PS termination process request is issued from the upper layer. The camera 1 then sends a PS termination request 908 to the printer 2 and receives a PS termination confirmation 909 from the printer 2. Since the camera 1 is transitioned to the PS mode, the camera 1 terminates the PS mode (907). The camera 1 and the printer 2 cancel the second confidential mode (910, 912) and perform an IP address reassignment process (911, 913). The camera 1 and the printer 2 then perform communication in a normal communication mode state where the power-saving control function is not used.

Note that in FIG. 1 when the camera 1 joins the network 4, a command to join the network is issued to the wireless module 101 from the camera function unit 102. Then, a wireless signal compliant with the IEEE802.11 standard is sent/received by the MAC processing unit 106 and the RF processing unit 105, and thus a network is formed. The setting and changing of a confidential mode are performed such that a command to set a confidential mode is issued to the wireless module 101 from the camera function unit 102 and the command is encrypted and decrypted using a WEP key whose data is specified by the MAC processing unit 106. The PS process for transitioning to the PS mode is performed such that a command to execute a PS mode transition is issued to the wireless module 101 from the camera function unit 102 and the MAC processing unit 106 performs control to intermittently turn off the current to the RF processing unit 105. Likewise, the PS termination process for terminating the operation of the PS mode is performed such that a command to terminate the PS mode is issued to the wireless module 101 from the camera function unit 102 and the MAC processing unit 106 performs control to allow the current to the RF processing unit 105 to continuously flow. The second confidential mode is cancelled such that a command to cancel the second confidential mode is issued to the wireless module 101 from the camera function unit 102 and the command is encrypted and decrypted using a WEP key whose data is specified by the MAC processing unit 106. Note that in the case where encrypted communication is not performed after the second confidential mode is canceled, the data is encrypted/decrypted at the MAC processing unit 106. The process for an IP address reassignment is performed such that an IP address change is made by the camera function unit 102 and whether the same IP address is present on the network is checked by means of an ARP Request message. If there is no wireless communication apparatus of the same IP address, the IP address is used as a new IP address. If there is a wireless communication apparatus of the same IP address, another IP address change is made. This process is repeated until there is no wireless communication apparatus of the same IP address.

Likewise, the control of the wireless module 201 by the printer function unit 202 in the printer 2 is substantially the same as the control of the wireless module 101 by the camera function unit 102 in the camera 1, and thus, a description thereof is not repeated here.

Second Embodiment

In a second embodiment, a beacon is monitored after the above-described second confidential mode is canceled. Based on a received beacon, it is determined whether a new wireless communication apparatus has joined a network 4 during the operation of the PS function. Then, based on a result of the determination, an IP address reassignment process is performed.

Note that the configuration of the camera and the printer and the process performed when the operation of the PS function starts are the same as those described in the first embodiment, and thus, a description thereof is not repeated here. Note also that for the PS function operation termination process, steps from S801 to S806 and steps from S808 to S812 in FIG. 8 are the same as those for the first embodiment.

Figure 10:
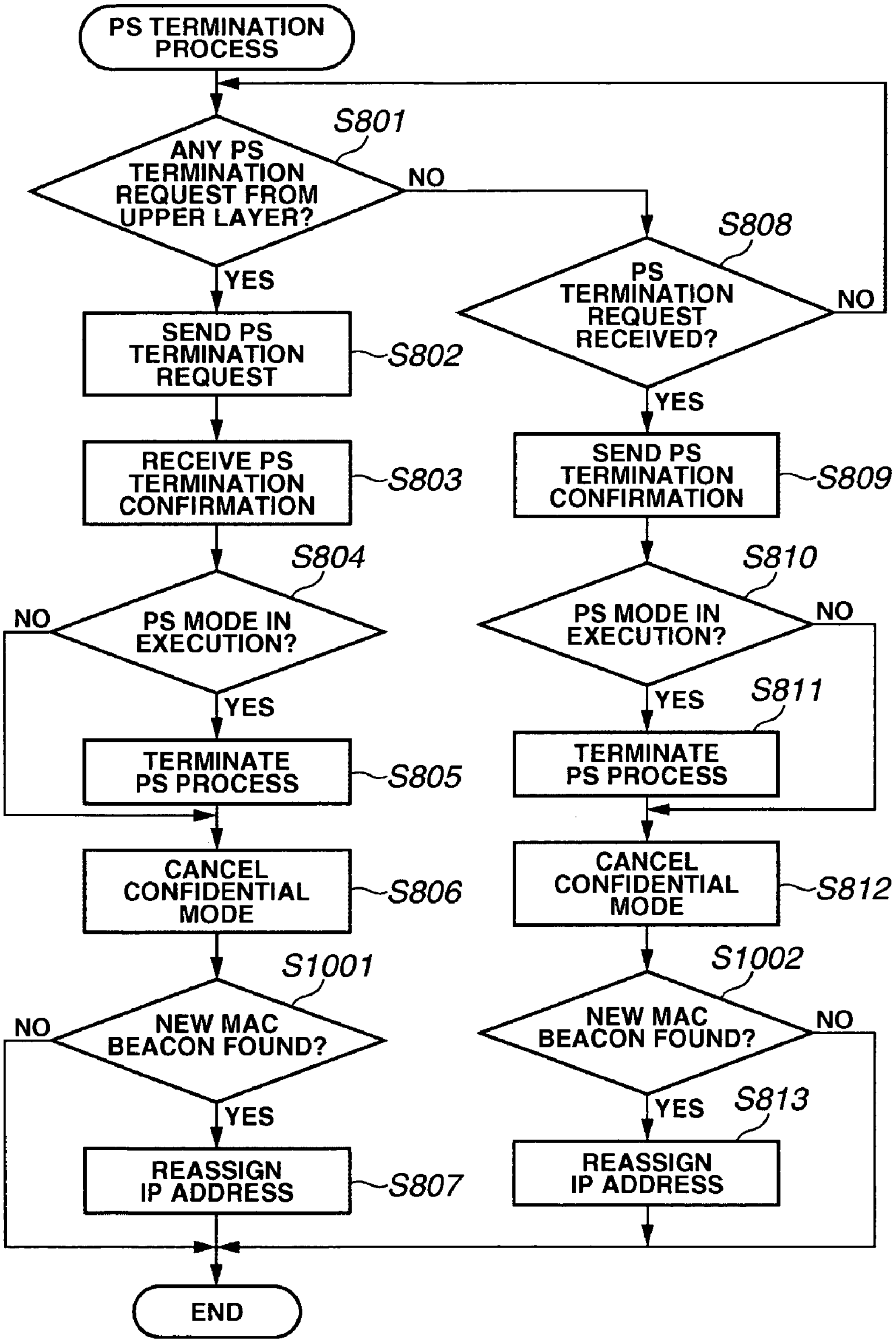
FIG. 10 is a flowchart of a PS function operation termination process according to a second embodiment of the present invention.

A PS termination process performed by a camera 1 and a printer 2 according to a second embodiment is described next with reference to FIG. 10.

Figure 8:
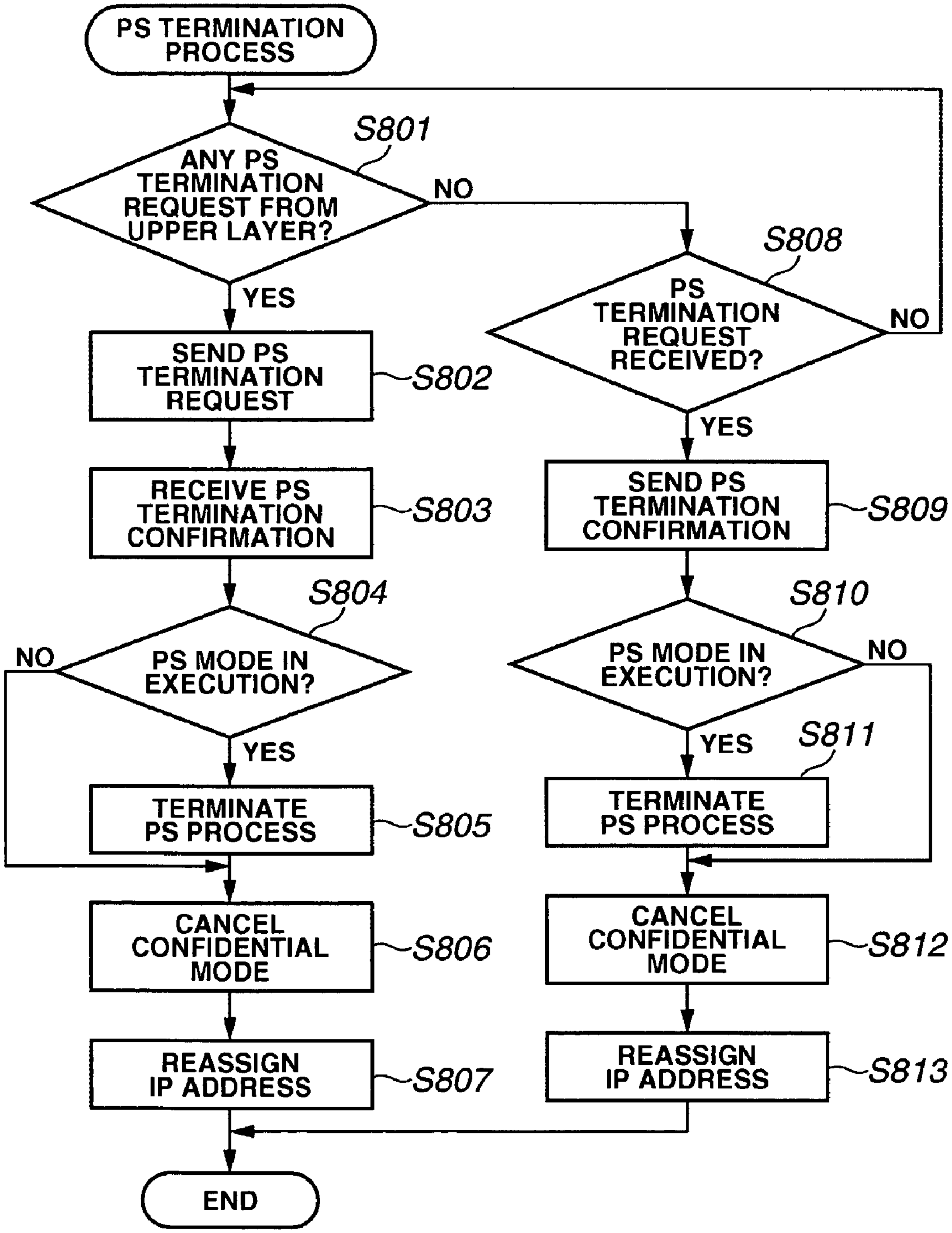
FIG. 8 is a flowchart of a PS function operation termination process according to the embodiment of the present invention.

The camera 1 performs the processes from step S801 to step S805, as illustrated in FIG. 8. Then, when the camera 1 cancels the second confidential mode (step S806), the camera 1 monitors, for a predetermined period of time, a beacon signal that is notified by other wireless communication apparatuses. When the camera 1 receives a beacon signal, the camera 1 obtains a MAC address contained in the beacon signal and being an identifier representing a wireless communication apparatus that is the sender of the beacon signal. If the MAC address is the MAC address of a wireless communication apparatus that is not present before the operation of the PS function starts, the camera 1 determines that a new wireless communication apparatus (camera 36) has joined the network 4 during the operation of the PS function (yes in step S1001), and the procedure proceeds to step S807. At step S807, the camera 1 performs an IP address reassignment process. The camera 1 then performs communication in a normal communication state where the power-saving control function is not used.

If all MAC addresses obtained from received beacon signals are already present before the operation of the PS function starts (no in step S1001), the camera 1 performs, without performing an IP address reassignment process, communication in a normal communication state where the power-saving control function is not used.

Likewise, the printer 2 performs the processes from step S808 to step S811, as illustrated in FIG. 8 and described above. Then, when the printer 2 cancels the second confidential mode (step S812), the printer 2 monitors, for a predetermined period of time, a beacon signal that is notified by other wireless communication apparatuses. When the printer 2 receives a beacon signal, the printer 2 obtains a MAC address contained in the beacon signal and being an identifier representing a wireless communication apparatus that is the sender of the beacon signal. If the MAC address is the MAC address of a wireless communication apparatus that is not present before the operation of the PS function starts, the printer 2 determines that a new wireless communication apparatus (camera 36) has joined the network 4 during the operation of the PS function (yes step S1002), and the procedure proceeds to step S813. At step S813, the printer 2 performs an IP address reassignment process. The printer 2 then performs communication in a normal communication state where the power-saving control function is not used.

If all MAC addresses obtained from received beacon signals are already present before the operation of the PS function starts (no in step S1002), the printer 2 performs, without performing an IP address reassignment process, communication in a normal communication state where the power-saving control function is not used.

The determination at steps S1001 and S1002 is made as follows. The MAC addresses of the respective wireless communication apparatuses present in the network 4 are obtained from beacon signals that are notified by the wireless communication apparatuses in the network 4 before the operation of the PS function starts and the addresses are stored. Then, a comparison is made with such information, and the determination is made.

In the description of the first embodiment, in the network 4, the first confidential mode is preset, the camera 1 and the printer 2 transition to the second confidential mode, and when the second confidential mode is canceled, the camera 1 and the printer 2 return to the first confidential mode. In another embodiment, in the network 4, encrypted communication may not be performed, and thereafter, the camera 1 and the printer 2 may transition to a confidential mode that enables encrypted communication, and when the confidential mode is canceled, the camera 1 and the printer 2 may return to communication without encrypted communication.

Although it is described that a printer does not transition to the PS mode, the printer may transition to the PS mode so as to reduce power consumption. In this case, at step S710 in FIG. 7, the printer performs a PS process for transitioning to the PS mode. If the printer transitions to the PS mode, the printer performs, at step S811 in FIG. 8, a PS termination process for terminating the PS process.

Furthermore, although the above description is provided for the case where the operation of the PS function is performed between a camera and a printer, the operation of the PS function may be performed between cameras.

Although in the above description a WEP key used in the second confidential mode is determined between a camera and a printer upon PS mode transition, the WEP key my be predetermined.

Although in the above description a confidential mode enables encrypted communication using a WEP key, TKIP (Temporal Key Integrity Protocol) that automatically updates the encryption key at intervals of a predetermined period of time may be used.

In the case where the camera 1 terminates communicating with the printer 2 upon terminating of the PS mode, or in the case where the printer 2 terminates communicating with the camera 1 upon terminating of the PS mode, the apparatus that terminates communicating with its counterpart does not need to perform an IP address reassignment process. In such a case, after step S806 or step S812 in FIG. 8, the apparatus determines whether to terminate communication. The apparatus having determined to terminate communication then terminates communication without performing an IP address reassignment process. Note, however, that in the case where one apparatus terminates communication and the other apparatus continues communication within the network 4, the apparatus that continues communication within the network 4 performs an IP address reassignment process.

The present invention can be applied to cameras and printers and also to various apparatuses such as, for example, information processing apparatuses such as personal computers, video output apparatuses such as televisions, and image input apparatuses such as scanners.

As described above, according to the embodiment of the present invention, upon transitioning to the PS mode, since communication apparatuses transition to a communication state where a new encryption key is used, the communication apparatuses having transitioned to the PS mode can communicate with each other exclusively. In addition, it is possible to prevent the low power consumption effect brought about by the PS mode from being hampered by other communication apparatuses.

When the PS mode terminates or when a new communication apparatus joins the network during the PS mode, an IP address reassignment process is performed, and thus, it is possible to prevent an IP address from being overlappingly assigned. In addition, without a communication apparatus, which is the sender of data, detecting or managing the power-saving state of a receiver communication apparatus, it is possible to prevent the receiver communication apparatus from performing an unnecessary process or causing data reception errors. As a result, the PS mode can be used efficiently and actively, enhancing the low power consumption effect.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-037718 filed Feb. 15, 2005, which is hereby incorporated by reference herein in its entirety.

What is claimed is:

1. A communication apparatus comprising:

a communication unit having a power-saving function configured to initiate a transition to a power-saving communication state wherein the communication apparatus communicates with a first device;

an encryption unit configured to transition to a first encrypted communication state where a predetermined encryption key is used to communicate with the first device when the communication unit initiates the transition to the power-saving communication state and to transition to a second encrypted communication state where a different encryption key from the predetermined encryption key is used or an unencrypted communication state when the communication unit terminates the power-saving communication state, wherein the predetermined encryption key is not used before transitioning to the power-saving communication state; and an address reassignment unit configured to broadcast a message for confirming overlap of a network address of the communication apparatus with a network address of a second device and to reassign a network address of the communication apparatus in a case where the encryption unit transitions to the second encrypted communication state or to the unencrypted communication state from the first encrypted communication state when the communication unit terminates the power-saving communication state, wherein the communication unit communicates with the first device in the second encrypted communication state or the unencrypted communication state after the reassignment of the network address of the communication apparatus is completed.

2. The communication apparatus according to claim 1, wherein the predetermined encryption key is different from a first encryption key used in communication before transitioning to the power-saving communication state, and wherein the communication unit is configured to return to a communication state where the first encryption key is used when the communication unit terminates the power-saving communication state.

3. The communication apparatus according to claim 1, wherein if encrypted communication is not performed before transitioning to the power-saving communication state, the communication unit is configured to return to the unencrypted communication state without encrypted communication when the communication unit terminates the power-saving communication state.

4. The communication apparatus according to claim 1, wherein the power-saving function reduces power consumption at least during standby.

5. The communication apparatus according to claim 1, further comprising a detecting unit configured to detect a new communication apparatus which has joined a network which the communication apparatus joins, wherein the address reassignment unit reassigns the network address of the communication apparatus if the detecting unit detects the new communication apparatus after transitioning to the power-saving communication state.

6. The communication apparatus according to claim 1, wherein the communication unit is configured to communicate in an ad hoc network which allows communication apparatuses to perform direct communication.

7. A communication method by a communication apparatus, the method comprising:

transitioning to a power-saving communication state where a power-saving function is used;

transitioning to a first encrypted communication state where a predetermined encryption key is used to communicate with a first device when the communication apparatus transitions to the power-saving communication state;

terminating the power-saving communication state;

transitioning to a second encrypted communication state where a different encryption key from the predetermined encryption key is used or an unencrypted communication state when the power-saving communication state is terminated; and broadcasting a message for confirming overlap of a network address of the communication apparatus with a network address of a second device and to reassign a network address of the communication apparatus in a case where the communication apparatus transitions to the second encrypted communication state or the unencrypted communication state from the first encrypted communication state when the power-saving communication state is terminated, wherein communication with the first device in the second encrypted communication state or the unencrypted communication state after the reassignment of the network address of the communication apparatus is completed.

* * * * *